United States Patent [19]
Adachi et al.

[11] Patent Number: 6,145,641
[45] Date of Patent: Nov. 14, 2000

[54] HUB CLUTCH ASSEMBLY

[75] Inventors: Kenro Adachi; Takayuki Norimatsu, both of Shizuoka, Japan

[73] Assignee: NTN Corporation, Osaka, Japan

[21] Appl. No.: 09/313,351

[22] Filed: May 18, 1999

[30] Foreign Application Priority Data

May 21, 1998 [JP] Japan .................................. 10-139634

[51] Int. Cl.$^7$ ............................................... B60K 23/00
[52] U.S. Cl. ..................... 192/69.41; 192/88 A
[58] Field of Search .................... 192/69.41, 86, 192/85 A, 88 A; 180/247; 92/98 D, 103 R, 103 SD

[56] References Cited

U.S. PATENT DOCUMENTS

| | | | |
|---|---|---|---|
| 4,429,068 | 1/1984 | Nakahira | 524/302 |
| 4,960,192 | 10/1990 | Kurihara | 192/85 V X |
| 5,550,190 | 8/1996 | Hasegawa et al. | 525/92 A |
| 5,871,072 | 2/1999 | Itoh et al. | 192/69.41 |
| 5,950,785 | 9/1999 | Adachi et al. | 192/69.41 |

*Primary Examiner*—Richard M. Lorence
*Attorney, Agent, or Firm*—Wenderoth, Lind & Ponack, L.L.P.

[57] ABSTRACT

The instant invention pertains to a hub clutch assembly mounted between an axle and a hub of a four-wheel drive vehicle for changeover between two-wheel drive and four-wheel drive using fluid pressure. An inner ring is moved, by supplying or sucking air to or from one of the chambers airtightly sealed by a diaphragm, into or out of engagement with an outer ring for changeover between two-wheel drive and four-wheel drive modes. The diaphragm has a hardness of 50–70 Hw to prevent a reduction in the thrust of fluid pressure for changeover. The diaphragm also has a convex configuration extending towards the outer ring.

20 Claims, 4 Drawing Sheets

HUB CLUTCH ASSEMBLY

BACKGROUND OF THE INVENTION

This invention relates to hub clutch assemblies mounted on the front wheels of a four-wheel drive vehicle for selective transmission and cutoff of the driving force between the axle and the wheel hubs.

A part-time four-wheel drive vehicle is provided with a hub clutch assembly between the front wheel axle and each front wheel hub for selective transmission and cutoff of the driving force to and from the front wheels.

FIGS. 3 and 4 show a conventional hub clutch assembly that uses air pressure for such selective transmission and cutoff of driving force. It comprises a spindle 2 mounted around a front wheel axle 1 of a four-wheel drive vehicle and fixedly supported to a knuckle of the vehicle, and a wheel hub 4 rotatably supported by the spindle 2 through a bearing 3.

A cover 5 is secured to the end of the wheel hub 4 by bolts 6 with a gasket 7 interposed therebetween to seal the end of the wheel hub 4. The hub clutch assembly further includes an inner ring 8 as a driving member mounted on the axle 1 near its end by serrations 9 so as to be axially movable but non-rotatable relative to the axle 1. The inner ring 8 is formed on its outer periphery with an external gear 10.

The hub clutch assembly further includes an outer ring 11 as a driven member mounted to the inner surface of the cover 5 through serrations 12 so as to rotate together with the cover 5. On its inner periphery, the outer ring 11 carries an internal gear 13 so as to mesh with the external gear 10 on the inner ring 8.

Inside the cover 5, a diaphragm 14 has an outer edge airtightly secured to the inner periphery of the cover 5, and an inner edge airtightly secured to the inner ring 8 so as to be movable together with the inner ring 8. The outer edge is sandwiched between sleeve 27 and a yoke (not numbered). The diaphragm 14 thus defines two airtightly sealed chambers 15 and 16 at both sides thereof inside the cover 5. By supplying air into one of the chambers 15, 16 and sucking air from the other, it is possible to axially move the inner ring 8 to bring its external gear 10 into or out of mesh with the internal gear 13 of the outer ring 11. Four-wheel and two-wheel drive modes thus change over.

The inner ring 8 is biased inwardly by a spring 17 mounted in a compressed state between the diaphragm 14 and the cover 5. A magnet 19 (FIG. 4) is centrally fixed to the inner surface of the cover 5 through a yoke 20. Opposite the magnet 19, the diaphragm 14 carries on its outer side a magnetizable plate or washer 18. When the inner ring 8 is at its outermost position, the magnet 19 attracts the plate 18, thus holding the inner ring at this position.

For changeover between four-wheel drive and two-wheel drive modes, the hub clutch assembly has two separate air passages 21 and 22 communicating with the chambers 15 and 16, respectively.

The first air passage 21 comprises a passage 21a formed in the cover 5 and communicating with the chamber 15, a space 21b between the spindle 2 and the wheel hub 4, a gap inside the bearing 3 communicating with the space 21b, and a passage 21c formed in the rear end of the spindle 2 and communicating with the gap in the bearing 3. The passage 21c is connected to an air source through an air pipe 23.

The second air passage 22 comprises a gap 22a between the front wheel axle 1 and the spindle 2 and communicating with the inner chamber 16, and a passage 22b formed in the rear end of the spindle 2 and communicating with the gap 22a. The passage 22b is connected to an air source through an air pipe 24.

The chambers 15 and 16 are airtightly sealed by an oil seal 26 disposed between the inner surface of the cover 5 and a nut 25 threaded onto the tip of the spindle 2.

To set the drive mode into a four-wheel drive position, the inner ring 8 is moved until its external gear 10 meshes with the internal gear 13 of the outer ring 11.

In this state, the front wheel axle 1 is coupled to the outer ring 11 for four-wheel drive, so that the engine drive can be applied to all four vehicle wheels.

For changeover from four-wheel drive to two-wheel drive, the air in the outer chamber 15 is sucked therefrom to let the inner ring 8 move against the force of the spring 17 by the pressure difference on both sides of the diaphragm 14 until the external gear 10 disengages from the internal gear 13 (FIG. 3). The inner ring 8 is held in this position by the magnet 19.

Changeover between four-wheel drive and two-wheel drive is carried out by creating negative or positive pressure in the chamber 15 or 16. The two-wheel drive position is maintained by the attracting force of the magnet 19. The four-wheel drive position is maintained by the force of the spring 17.

The diaphragms of such conventional hub clutch assemblies all have a hardness of 71 Hw or greater for durability, and are arranged such that no stresses act thereon with the inner ring disengaged from the outer ring.

Although a diaphragm having a hardness of 71 Hw or greater is durable enough, a large thrust is needed to deform such a diaphragm for changeover from two-wheel drive to four-wheel drive.

Especially if the diaphragm is arranged such that no stresses act thereon when the inner ring is disengaged from the outer ring for a two-wheel drive mode, when pressure is applied for changeover to four-wheel drive, the fluid pressure is first used to deform the diaphragm, so that the thrust by the fluid decreases accordingly. This may make the changeover to four-wheel drive difficult. This is because for changeover to four-wheel drive, the external gear 10 has to be brought into mesh with the internal gear 13 by moving the inner ring 8, and a greater thrust is needed to mesh the gears with each other than to disengage them from each other.

An object of this invention is to provide a hub clutch assembly which can be changed over to four-wheel drive mode with a reduced thrust.

SUMMARY OF THE INVENTION

According to this invention, there is provided a hub clutch assembly comprising a driving member coupled to an axle of a vehicle, a driven member coupled to a wheel hub and rotatably mounted around the driving member, a diaphragm mounted to define two airtightly sealed chambers, and a means for controlling pressures in the chambers to couple the driving member and the driven member together and disengage them from each other, wherein the diaphragm has a hardness of 50–70 Hw.

Other features and objects of the present invention will become apparent from the following description made with reference to the accompanying drawings, in which:

DETAILED DESCRIPTION OF THE PREFERRED EMBODIMENT

Figure 2A:
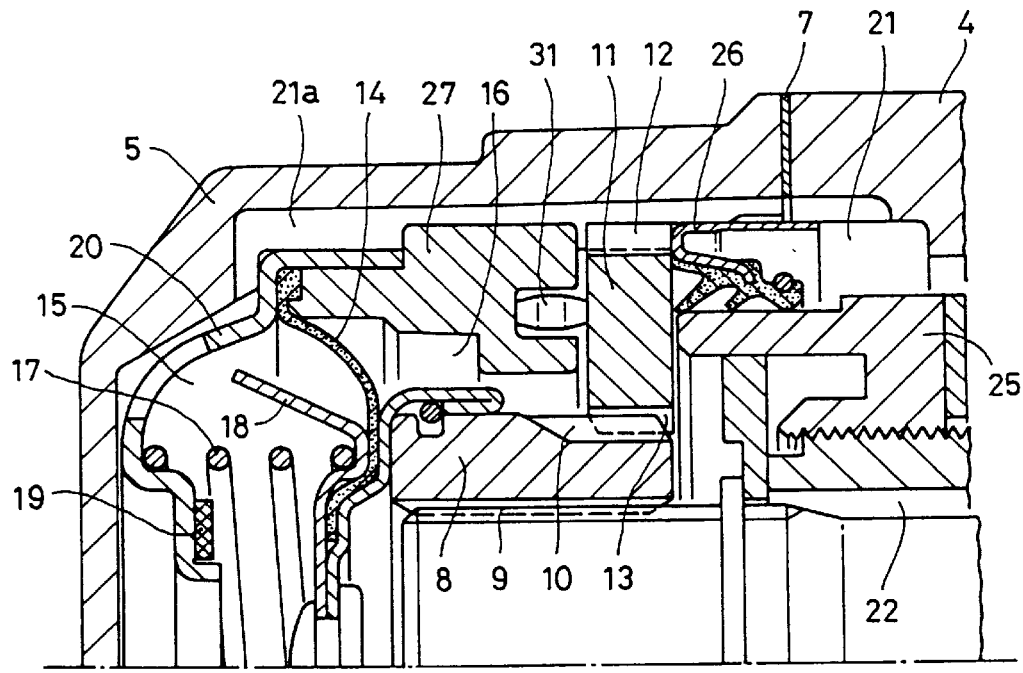
FIG. 2A is a partial vertical sectional view of the hub clutch assembly embodying this invention in a four-wheel drive mode.
Figure 2B:
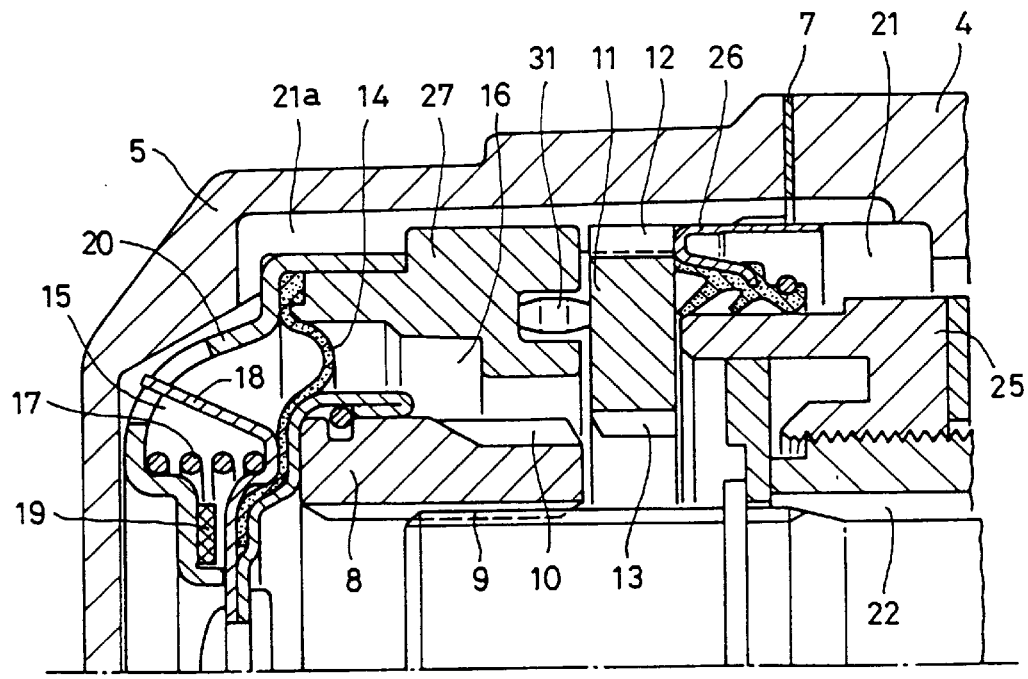
FIG. 2B is a partial sectional view of the hub clutch assembly embodying this invention in a two-wheel drive mode.
Figure 3:
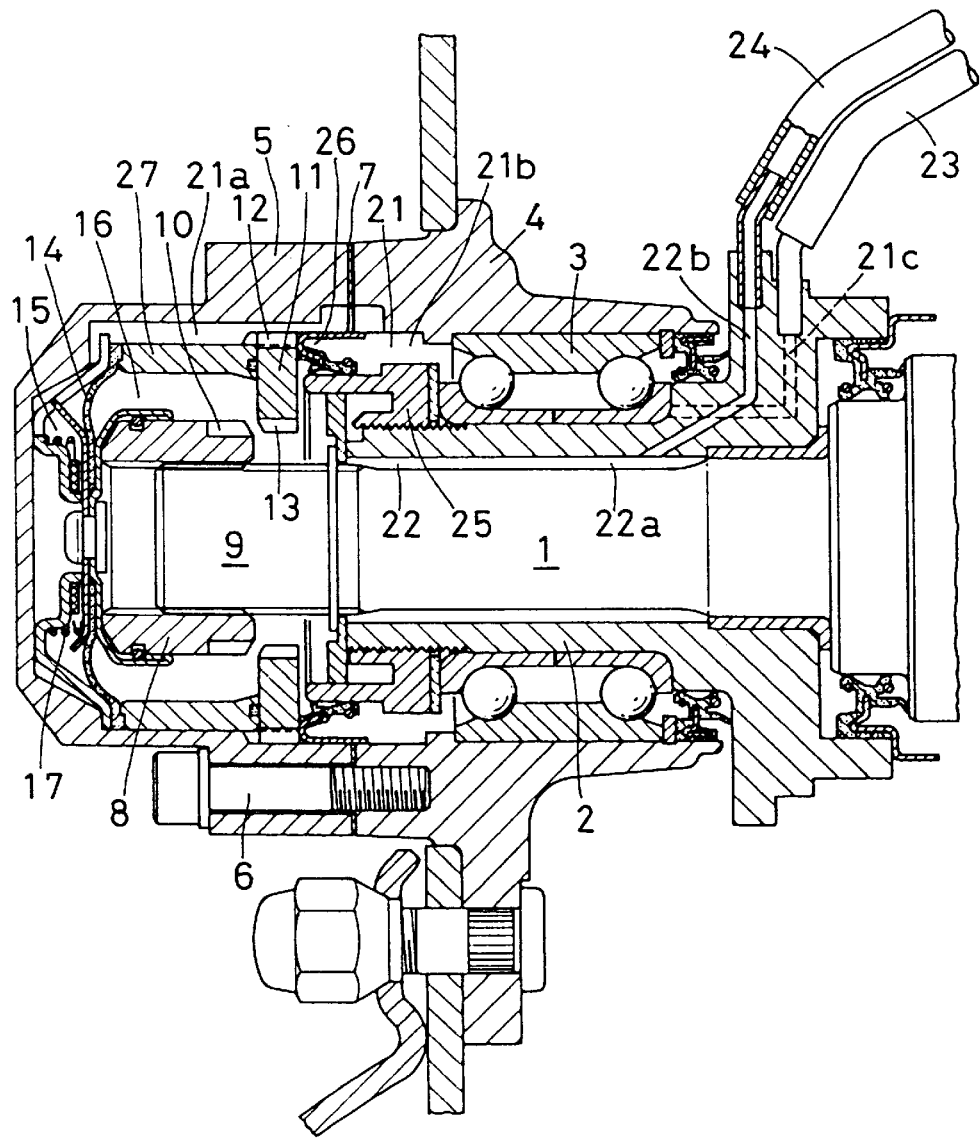
FIG. 3 is a vertical sectional view of a conventional hub clutch assembly in a two-wheel drive mode.
Figure 4:
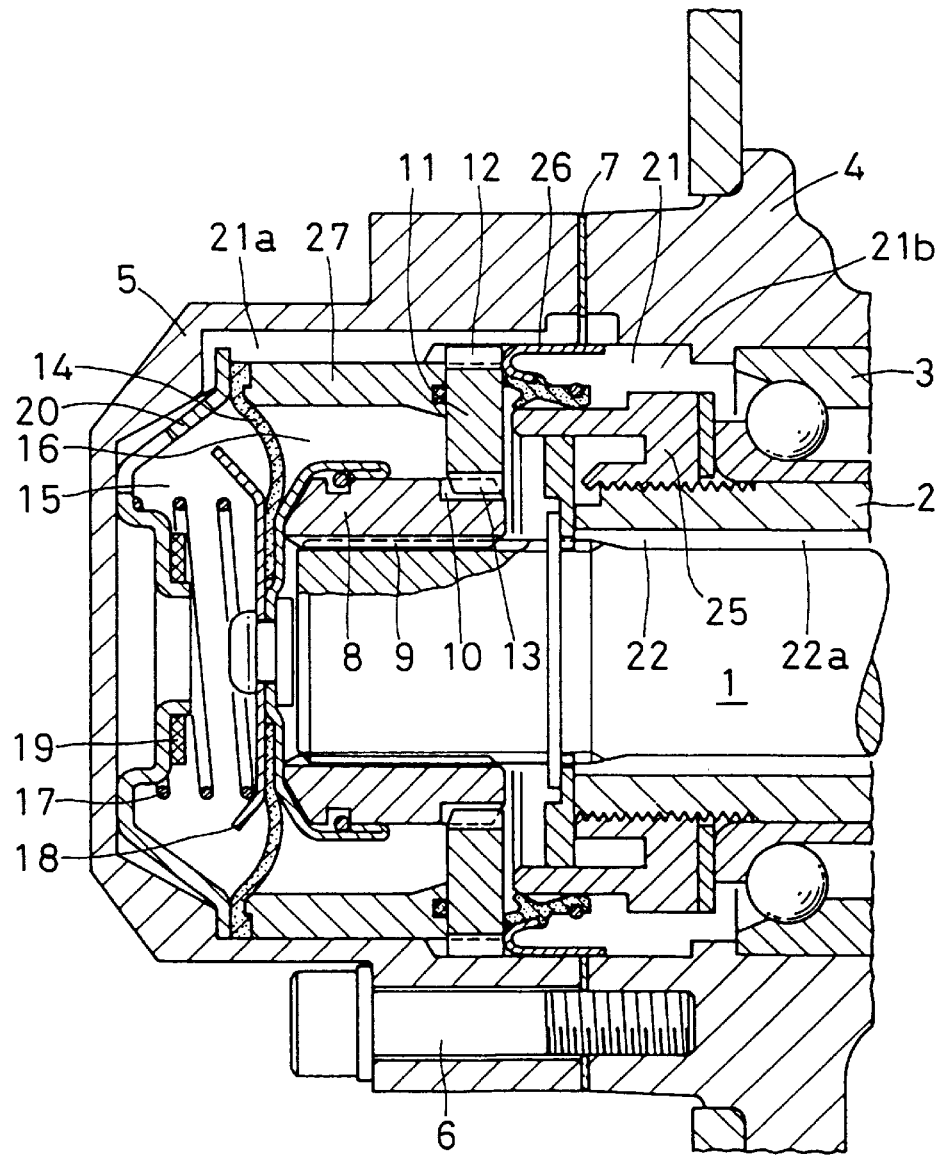
FIG. 4 is a partial enlarged, vertical sectional view of the hub clutch assembly of FIG. 3 in a four-wheel drive mode.

An embodiment of this invention is described with reference to FIGS. 1, 2A and 2B. The hub clutch assembly of this embodiment is basically similar in structure and function to the conventional one shown in FIGS. 3 and 4. Thus, like elements are simply denoted by like numerals and a detailed description thereof is omitted.

Figure 1:
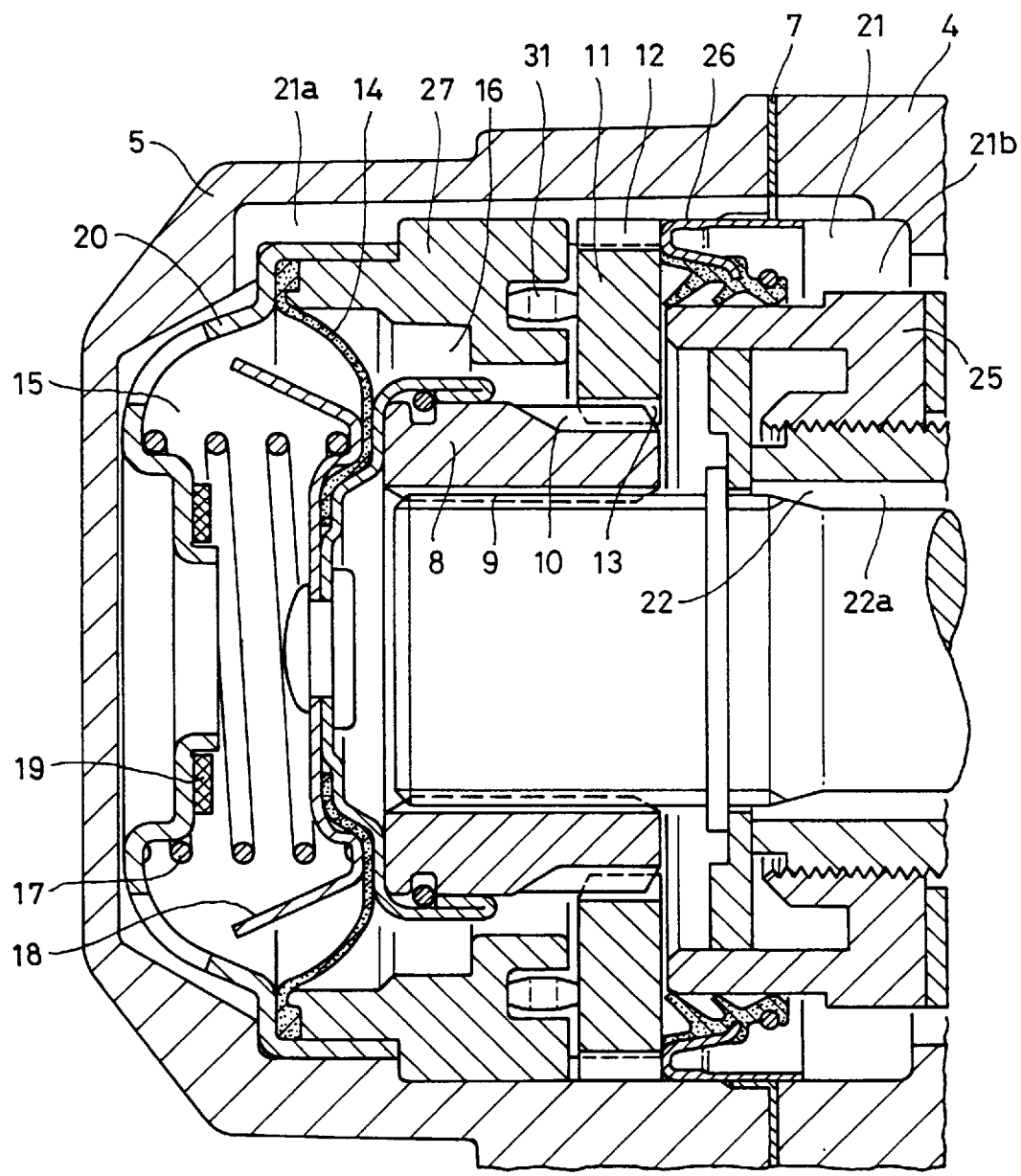
FIG. 1 is a vertical sectional view of a hub clutch assembly embodying this invention in a four-wheel drive mode.

As shown in FIG. 1, the hub clutch assembly is assembled by inserting the yoke 20, diaphragm 14, sleeve 27, outer ring 11, and oil seal 26, one after another into the cover 5. The yoke 20 is pressed onto the sleeve 27 with the outer edge of the diaphragm 14 sandwiched therebetween. A resilient ring 31 is mounted in a compressed state between the sleeve 27 and the outer ring 11.

In this arrangement, the diaphragm 14 can be held in position by only two parts, i.e. yoke 20 and sleeve 27. It is thus easy to set the interference of the diaphragm at a suitable level. A suitable tolerance is thus attained.

The diaphragm 14 has an Hw hardness of 50–70 and is arranged such that it is free and no stresses act thereon while the inner ring 8 and the outer ring 11 are coupled together (i.e. in four-wheel drive mode).

The diaphragm 14 may be made of CR (chloroprene rubber), NBR (acrylonitrile-butadiene rubber), hydrin, fluorosilicon, fluororesin, H-NBR, polyethylene or polypropylene.

The diaphragm 14 is 0.7 mm thick and has a convolution diameter of 52 mm. If its hardness is 49 Hw or less, its durability will be insufficient, and if its hardness is 71 Hw or greater, a large resistance will be encountered to deform the diaphragm during changeover, thus lowering the actuating thrust of fluid applied against the diaphragm 14.

If the hardness of the diaphragm 14 is set at 50–70 Hw, it is possible to reduce resistance during changeover to two wheel-drive or four-wheel drive without lowering durability of the diaphragm 14, and also without lowering the actuating thrust of fluid pressure necessary for the changeover.

Since the diaphragm 14 is arranged so as to be in a non-stressed free state during the four-wheel drive mode, when the drive mode is changed over from two-wheel drive (that is, the state shown in FIG. 2B) to four-wheel drive, less thrust is used to move the diaphragm 14 into the four-wheel drive state because the diaphragm tend to return to its original free state. Since the diaphragm has been partly convexed in a direction towards the outer ring 11 while in a two-wheel drive mode, less power is needed to get the diaphragm back to its original convexed position for four-wheel drive. Thus, a greater part of the fluid thrust can be used to move the inner ring. Reliable changeover to four-wheel drive is thus possible.

For changeover from four-wheel drive to two-wheel drive, pressure has to be used to oppositely convex the diaphragm in a direction towards the magnet 19. Thus, the actuation thrust of the fluid pressure applied for this changeover decreases. But the force of the magnet 19 makes up for such a reduction in the thrust, so that there will be no trouble in changeover from four-wheel drive to two-wheel drive.

According to the present invention, because the hardness of the diaphragm is set to the range between 50 and 70 Hw, the resistance to deformation of the diaphragm for changeover between two-wheel drive and four-wheel drive is limited to an optimal range while maintaining the durability of the diaphragm, thus preventing a decrease in the thrust by the pressurized fluid applied against the diaphragm.

Also, because the diaphragm is in its free state with the driving member engaged with the driven member, the thrust by the pressurized fluid is prevented from decreasing when the drive mode is changed over from two-wheel drive to four-wheel drive.

What is claimed:

1. A hub clutch assembly, comprising:

a driving member;

a driven member operably associated with said driving member; and a diaphragm, having a hardness of 50–70 Hw, operably associated with said driving member and said driven member, wherein said diaphragm is movable under fluid pressure between a first position in which said driving member is disengaged from said driven member and a second position in which said driving member is engaged with said driven member.

2. The hub clutch assembly according to claim 1, wherein said driving member is a ring coupled to an axle and having an external gear, wherein said driven member is a ring having an internal gear, and wherein said external gear surrounds and engages said internal gear when said diaphragm is moved to said second position.

3. The hub clutch assembly according to claim 2, and further comprising a magnet to maintain said diaphragm in said first position, a spring to maintain said diaphragm in said second position, and a pressure applier to apply fluid pressure to said diaphragm.

4. The hub clutch assembly according to claim 3, wherein said diaphragm is of a material selected from the group consisting of chloroprene rubber, acrylonitrile-butadiene rubber, hydrin, fluorosilicon, flouroresin, H-NBR, polyethylene and polypropylene.

5. The hub clutch assembly according to claim 4, wherein when in said first position said diaphragm defines a convexity directed along the direction of movement of said diaphragm from said first position to said second position.

6. The hub clutch assembly according to claim 1, wherein said diaphragm is of a material selected from the group consisting of chloroprene rubber, acrylonitrile-butadiene rubber, hydrin, fluorosilicon, fluororesin, H-NBR, polyethylene and polypropylene.

7. The hub clutch assembly according to claim 6, wherein said driving member is a ring coupled to an axle and having an external gear, wherein said driven member is a ring having an internal gear, and wherein said external gear surrounds and engages said internal gear when said diaphragm is moved to said second position.

8. The hub clutch assembly according to claim 6, and further comprising a magnet to maintain said diaphragm in said first position, a spring to maintain said diaphragm in said second position, and a pressure applier to apply fluid pressure to said diaphragm.

9. The hub clutch assembly according to claim 1, and further comprising a magnet to maintain said diaphragm in said first position, a spring to maintain said diaphragm in said second position, and a pressure applier to apply fluid pressure to said diaphragm.

10. The hub clutch assembly according to claim 1, wherein when in said first position said diaphragm defines a convexity directed along the direction of movement of said diaphragm from said first position to said second position.

11. The hub clutch assembly according to claim 10, wherein said driving member is a ring coupled to an axle and having an external gear, wherein said driven member is a ring having an internal gear, and wherein said external gear surrounds and engages said internal gear when said diaphragm is moved to said second position.

12. The hub clutch assembly according to claim 11, and further comprising a magnet to maintain said diaphragm in said first position, a spring to maintain said diaphragm in said second position, and a pressure applier to apply fluid pressure to said diaphragm.

13. A hub clutch assembly, comprising:

a driving member;

a driven member; and a diaphragm operably associated with said driving member and said driven member, wherein said diaphragm is movable under fluid pressure between a first position in which said driving member is disengaged from said driven member and a second position in which said driving member is engaged with said driven member, and wherein when in said first position said diaphragm defines a convexity directed along the direction of movement of said diaphragm from said first position to said second position.

14. The hub clutch assembly according to claim 13, wherein said driving member is a ring coupled to an axle and having an external gear, wherein said driven member is a ring having an internal gear, and wherein said external gear surrounds and engages said internal gear when said diaphragm is moved to said second position.

15. The hub clutch assembly according to claim 14, wherein said diaphragm is of a material selected from the group consisting of chloroprene rubber, acrylonitrile-butadiene rubber, hydrin, fluorosilicon, fluororesin, H-NBR, polyethylene and polypropylene.

16. The hub clutch assembly according to claim 15, and further comprising a magnet to maintain said diaphragm in said first position, a spring to maintain said diaphragm in said second position, and a pressure applier to apply fluid pressure to said diaphragm.

17. The hub clutch assembly according to claim 14, and further comprising a magnet to maintain said diaphragm in said first position, a spring to maintain said diaphragm in said second position, and a pressure applier to apply fluid pressure to said diaphragm.

18. The hub clutch assembly according to claim 13, wherein said diaphragm is of a material selected from the group consisting of chloroprene rubber, acrylonitrile-butadiene rubber, hydrin, fluorosilicon, fluororesin, H-NBR, polyethylene and polypropylene.

19. The hub clutch assembly according to claim 18, and further comprising a magnet to maintain said diaphragm in said first position, a spring to maintain said diaphragm in said second position, and a pressure applier to apply fluid pressure to said diaphragm.

20. The hub clutch assembly according to claim 13, and further comprising a magnet to maintain said diaphragm in said first position, a spring to maintain said diaphragm in said second position, and a pressure applier to apply fluid pressure to said diaphragm.

* * * * *